Feb. 16, 1960  C. H. MOTZ ET AL  2,924,884
GEAR TESTING APPARATUS
Filed Jan. 15, 1957
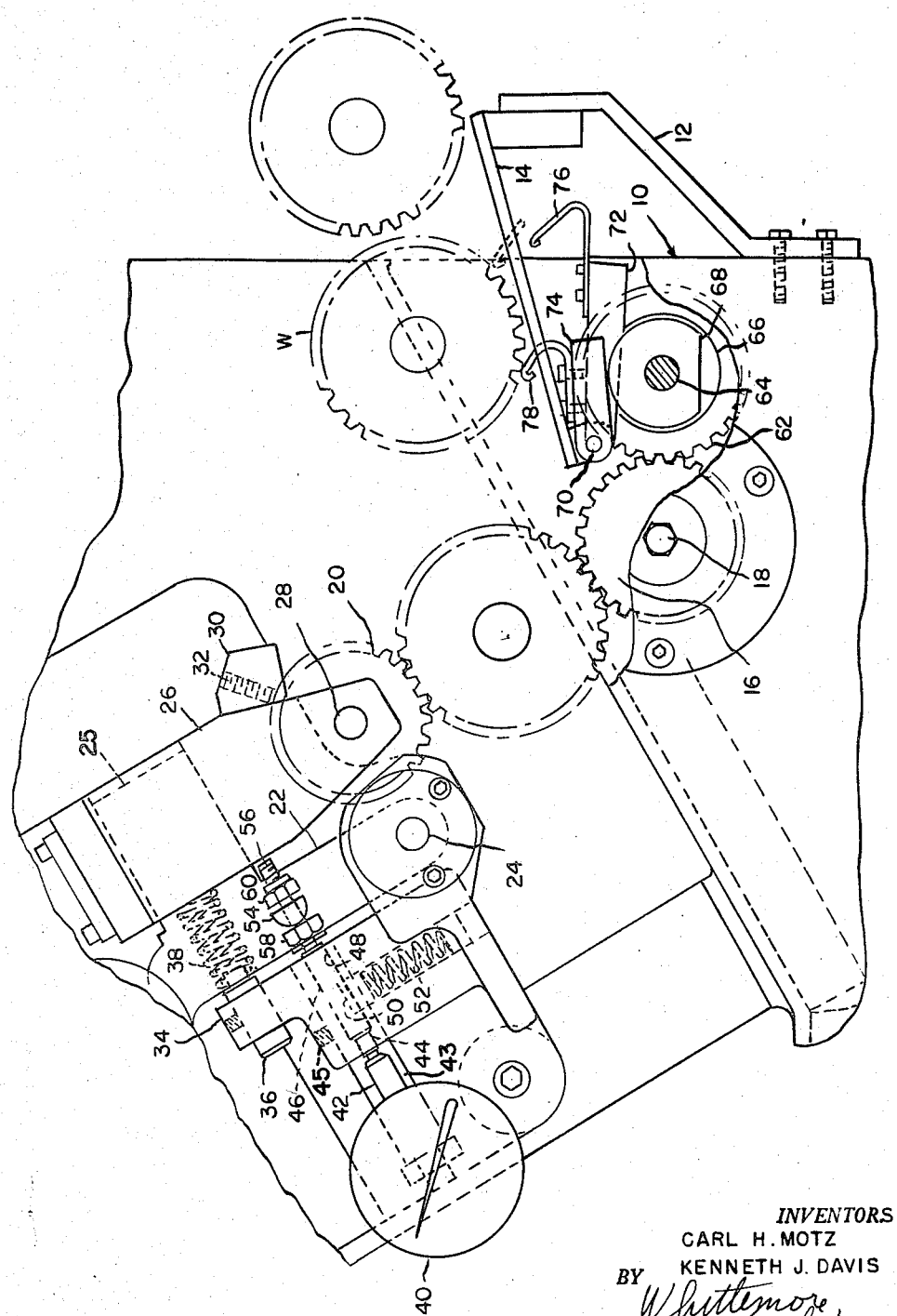
INVENTORS
CARL H. MOTZ
KENNETH J. DAVIS
BY
*Whittemore,*
*Hulbert & Belknap*
ATTORNEYS

# 2,924,884

GEAR TESTING APPARATUS

Carl H. Motz, East Detroit, and Kenneth J. Davis, Detroit, Mich., assignors to National Broach & Machine Company, Detroit, Mich., a corporation of Michigan Application January 15, 1957, Serial No. 634,272

9 Claims. (Cl. 33—179.5)

The present invention relates to gear testing apparatus.

It is an object of the present invention to provide apparatus for testing gears, and more particularly for checking or testing the size of gears, characterized by improved accuracy resulting from elimination of errors due to the eccentricity of a master gear, its bearings, etc.

More specifically, it is an object of the present invention to provide size checking equipment for work gears comprising a pair of radially spaced master gears between which a work gear is caused to pass, together with means for insuring that one of said master gears engages the work gear through teeth at a limited predetermined peripheral zone as it passes through a condition of tight mesh with both of said master gears.

Still more specifically, it is an object of the present invention to provide gear checking equipment comprising a first master gear fixed against rotation, a second rotatable master gear, means providing for relative separation and approach between said master gears, means for advancing a work gear into the space between said master gears, and means for insuring engagement between the work gear and the rotatable master gear at a predetermined limited peripheral zone of said rotatable master gear.

It is a further object of the present invention to provide for more rapid checking of a series of gears by employing a movable member to actuate a sensitive indicating or control device, and means providing a dwell in the movement of said member to afford time for operation of the indicating or control device.

Other objects and features of the invention will become apparent as the description proceeds, especially when taken in conjunction with the accompanying drawing, illustrating a preferred embodiment of the invention, wherein:

The figure is a fragmentary elevational view with parts broken away of gear checking apparatus constructed in accordance with the present invention.

In the drawing the apparatus comprises a frame 10 having a bracket 12 secured thereto for supporting the terminal portion of a loading or supply chute or rail 14 along which a series of work gears W advance. Mounted on the frame 10 is a first master gear 16, this master gear having means associated therewith for driving it in continuous rotation including the drive shaft 18. Carried by the frame is a second master gear 20 carried by means providing for movement of the master gear 20 generally toward and away from the rotating master gear 16. The means mounting the master gear 20 comprises a pivot arm 22 mounted for angular movement about a support 24 and having a lateral extension 25. Suitably mounted on the extension 25 of the arm 22 is a carrier 26 including a pivot pin 28 for rotatably supporting the master gear 20. The carrier 26 includes a projection 30 having a tapped opening for the reception of a set screw 32 adapted to engage the periphery of the master gear 20 so as to prevent rotation thereof. By loosening the set screw 32 the master gear 20 may be rotated into different positions of adjustment as required to bring new teeth thereof into operative position.

A fixed projection 34 on the frame carries a spring support pin 36 and extending between the pin and the carrier 26 is a compression spring 38 which tends to rotate the carrier 26 and the arm 22 clockwise as seen in the figure and thus to urge the master gear 20 toward the master gear 16.

Carried by the frame 10 is a control device in the form of a sensitive electrical limit switch 42 incorporating a dial indicator 40 which is mounted on a shaft 43 which is longitudinally adjustable and locked in position by screw 45. The limit switch 42 has a plunger 44 engageable by a slidable pin 46. The pin 46 is slidable longitudinally in an opening 48 and is engaged at one side thereof by a shoe 50 urged into frictional contact therewith by a compression spring 52. The shoe 50 thus acts as a brake opposing longitudinal sliding movement of the pin 46.

The arm 22 has a laterally extending apertured abutment 54 rigidly secured thereto. Slidable through the opening in the abutment 54 is a screw threaded extension 56 of the pin 46 having adjustable abutment nuts 58 and 60 carried thereby. The nuts 58 and 60 are adjusted to provide appreciable lost motion between opposite sides of the rigid abutment 54 for a purpose which will presently appear.

Mounted for rotation on the frame 10 is a gear 62 which is in meshing relation with the driven master gear 16 or an identical gear coaxial therewith. The gear 62 is secured to a shaft 64 carrying cams 66 and 68. Carried by the supply chute 14 is a pivot mounting 70 to which are pivoted arms 72 and 74 carrying resilient stop elements 76 and 78 respectively. The stop elements 76 and 78 are movable upwardly through appropriate openings in the rail or chute 14 into position to be engaged by work gears W.

With the parts in the position shown it will be observed that a work gear is in on-center position between the non-rotatable master gear 20 and the rotary driving master gear 16. At this time the master gear 20 has been moved a maximum distance away from the master gear 16 in accordance with the pitch diameter of the work gear being gauged. Accordingly, the carrier 26 and the arm 22 will have been rocked a maximum distance counterclockwise and the abutment 54 will have moved into engagement with the nut 58 and will have moved the pin 46 and the plunger 44 of the limit switch 42 to a position dependent upon the pitch diameter of the work gear being checked. It will be observed that at this instant a work gear is prevented from moving further along the chute or rail 14 by the resilient element 78 of the arm 74. At the same time, the resilient element 76 is in its lowered position which has permitted a work gear to move into engagement with the resilient stop 78. Continued rotation of the master gear 16 will cause the gear being gauged to pass through the space between the master gears 16 and 20. As customary, the sensitive control device 40 will actuate the appropriate one of a plurality of gates to separate the gauged gears into undersize, correct size, and oversize gears. Slight additional rotation of the master gear 16 will rotate the cam 66 to a position moving the arm 72 and its resilient stop element 76 upwardly to the dotted line position illustrated where it will engage the second succeeding work gear when the preceding work gear is released by downward movement of the resilient stop element 78.

It will be observed that the master gear 16 and the gear 62 are of the same size. Accordingly, rotation of the cam 68 which releases a work gear for movement into meshing engagement with the master gear 16 is in accurately timed relationship to rotation of the master gear 16. Thus, the work gears W when released by downward movement of the resilient stop element 78, will always move into meshed engagement with the same identical peripheral portion of the master gear 16. While the master gears are made with extreme accuracy, it is of course impossible to completely eliminate all eccentricity due to small errors in the production of the master gear or its rotary mounting means. However, by insuring that the succession of work gears aways meshes with the same peripheral portion of the rotatable master gear, it is possible to eliminate completely any error due to eccentricity of the master gear itself or of its mounting. In the same way, any eccentricity existing in the non-rotatable master gear 20 has no effect on the gauging operation. As a result, an extremely accurate gauging of the gears as to pitch diameter is rendered possible.

When a particular work gear has passed through the space between the master gears 16 and 20, the spring 38 is effective to move the non-rotatable master gear 20 toward the master gear 16. Initial movement of the master gear 20 results in movement of the rigid abutment 54 from a position in engagement with the nut 58 into engagement with the nut 60. During the time required for the rigid abutment to travel between the nuts 58 and 60, the slidable pin 46 remains stationary due to frictional engagement of the brake shoe 50. This provides for a continued actuation of the switch or control device 40 at the maximum reading and gives sufficient time for operation of a solenoid or other device to be actuated thereby. A second important advantage of the lost motion relationship between the abutment 54 and the nuts 58 and 60 is that during high speed operation in which a work gear may be moved through the space between master gears 16 and 20 at substantial speed, the brake action of the shoe 50 tends to prevent over-ride and completely eliminates the effect of inertia on the slidable pin 46. In the absence of the shoe 50 it will be appreciated that abrupt movement of the pin 46 would establish forces tending to produce an inaccurate reading. The master gear 16 may be removed from its drive shaft 18 and angularly adjusted so as to cause the advancing work gears W to engage a tooth or teeth at different peripheral portions. Thus, both master gears 16 and 20 may be adjusted when wear occurs to bring new teeth into action.

In accordance with the foregoing the improved construction completely eliminates the effect of any eccentricity errors in the rotatable master gear or its mounting, and in addition, permits a much more rapid gauging operation by providing a time delay in actuation of the micro switch at its maximum reading.

The drawings and the foregoing specification constitute a description of the improved gear testing apparatus in such full, clear, concise and exact terms as to enable any person skilled in the art to practice the invention, the scope of which is indicated by the appended claims.

What we claim as our invention is:

1. Gear gauging apparatus comprising a first master gear fixed against rotation, a second master gear, means driving said second master gear in rotation, means mounting said master gears for relative approach and separation, gauge means responsive to separation of said master gears as a work gear passes therebetween, means for advancing a work gear into contact with said second master gear, means for timing the advance of said work gear with respect to rotation of said master gear to insure that the work gear is in mesh with a tooth on a limited peripheral portion thereof as its center passes the line joining the centers of said master gears.

2. Gear gauging apparatus comprising a first master gear fixed against rotation, a second master gear, means driving said second master gear in rotation, means mounting said master gears for relative approach and separation, gauge means responsive to separation of said master gears as a work gear passes therebetween, an inclined chute for advancing a work gear into contact with said second master gear, means for timing the advance of said work gear with respect to rotation of said master gear to insure that the work gear is in mesh with a tooth on a limited peripheral portion thereof as its center passes the line joining the centers of said master gears.

3. Gear gauging apparatus comprising a first master gear fixed against rotation, a second master gear, means driving said second master gear in rotation, means mounting said master gears for relative approach and separation, gauge means responsive to separation of said master gears as a work gear passes therebetween, an inclined chute for advancing a work gear into contact with said second master gear, stop means engaging a gear on said chute, and means for operating said stop means in timed relation to rotation of said second master gear to insure that the work gear is in mesh with a tooth on a limited peripheral portion thereof as its center passes the line joining the centers of said master gears.

4. Gear gauging apparatus comprising a first master gear fixed against rotation, a second master gear, means driving said second master gear in rotation, means mounting said master gears for relative approach and separation, gauge means responsive to separation of said master gears as a work gear passes therebetween, an inclined chute for advancing a work gear into contact with said second master gear, stop means engaging a gear on said chute, and cam means for operating said stop means in timed relation to rotation of said second master gear to insure that the work gear is in mesh with a tooth on a limited peripheral portion thereof as its center passes the line joining the centers of said master gears.

5. Gear gauging apparatus comprising a first master gear fixed against rotation, a second master gear, means driving said second master gear in rotation, means mounting said master gears for relative approach and separation, gauge means responsive to separation of said master gears as a work gear passes therebetween, an inclined chute for advancing a work gear into contact with said second master gear, stop means engaging a gear on said chute, and a cam driven synchronously with said second master gear for releasing said stop means in timed relation to rotation of said second master gear.

6. Gear gauging apparatus comprising a first master gear fixed against rotation, a second master gear, means driving said second master gear in rotation, means mounting said master gears for relative approach and separation, gauge means responsive to separation of said master gears as a work gear passes therebetween, an inclined chute for advancing a work gear into contact with said second master gear, stop means engaging a gear on said chute, and a cam driven synchronously with said second master gear for releasing said stop means once during each rotation of said second master gear.

7. Gauging apparatus comprising an actuating member movable to different positions in accordance with different values of a characteristic of a work piece, a sensitive device, a movable transmission member extending between said device and said actuating member including a lost motion connection between said transmission member and said actuating member, and brake means opposing movement of said transmission member by said actuating member effective to prevent movement of said transmitting member except when positively moved by said actuating member and operable to maintain said transmission member for an appreciable interval at its maximum displacement by said actuating member.

8. Gear gauging apparatus comprising a first master gear, a second master gear movable toward and away from said first master gear, means for advancing a work gear in meshed relation with both master gears through the space therebetween, a rigid abutment movable with said second master gear, a transmission member having lost motion connection with said abutment, a sensitive control device in position to be actuated by said transmission member, and brake means operable on said transmission member effective to prevent movement of said transmitting member except when positively moved by said actuating member and thus operable to hold said transmission member at its position of maximum displacement by said abutment during initial return movement of said abutment.

9. Gear gauging apparatus comprising a first master gear mounted for angular adjustment, releasable means normally preventing rotation of said first master gear, a second master gear positioned in spaced relation to said first master gear with its axis substantially parallel to the axis of said first master gear, means driving said second master gear in rotation, means mounting said master gears for relative approach and separation, gauge means responsive to separation of said master gears as a work gear passes therebetween, means for advancing a work gear into contact with said second master gear, means for timing the advance of said work gear with respect to rotation of said master gear to insure that the work gear is in mesh with a tooth on a limited peripheral portion thereof as its center passes the line joining the centers of said master gears, and means for effecting adjustment of the second master gear to change the peripheral portion thereof contacted by a work gear, whereby both master gears may be adjusted to bring new teeth thereon into operation as wear occurs.

References Cited in the file of this patent

UNITED STATES PATENTS

| | | |
|---|---|---|
| 2,542,090 | Lorenz | Feb. 20, 1951 |
| 2,675,662 | Aller | Apr. 20, 1954 |
| 2,761,560 | Pomernacki | Sept. 4, 1956 |
| 2,803,342 | Gates | Aug. 20, 1957 |